Aug. 11, 1964 R. G. MOYER 3,143,877
LUBRICANT TESTING APPARATUS
Filed July 22, 1960
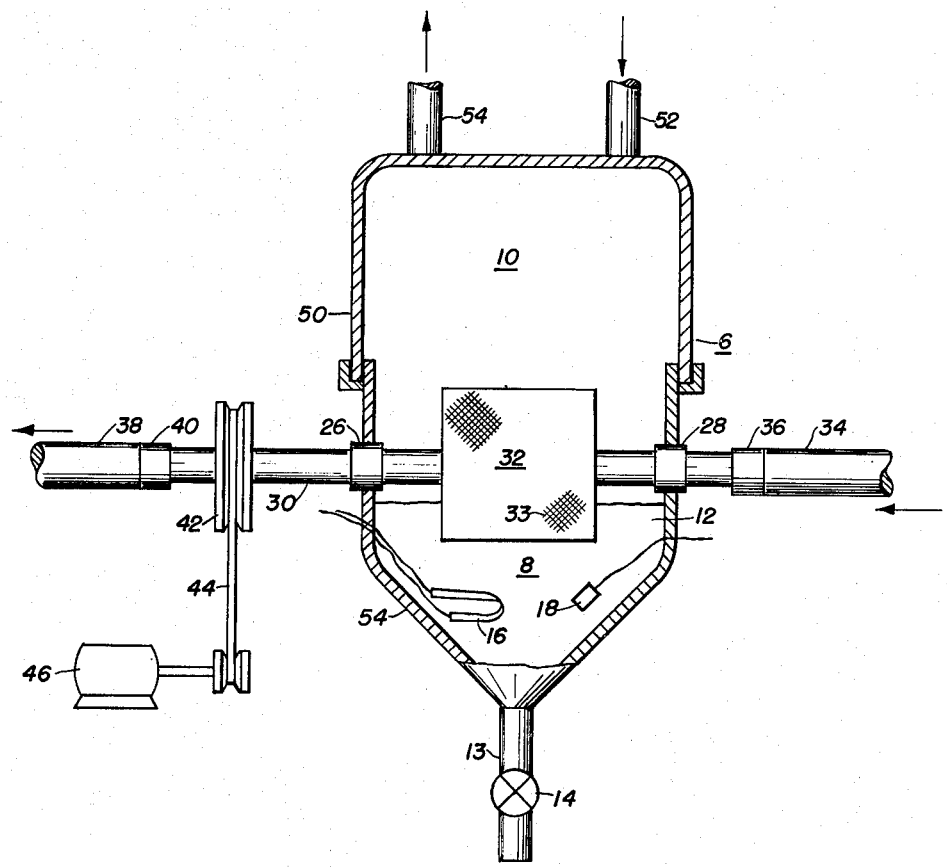
INVENTOR.
ROBERT G. MOYER
BY
ATTORNEY

United States Patent Office 3,143,877
Patented Aug. 11, 1964

3,143,877
LUBRICANT TESTING APPARATUS
Robert G. Moyer, Crystal Lake, Ill., assignor to The Pure Oil Company, Chicago, Ill., a corporation of Ohio
Filed July 22, 1960, Ser. No. 44,620
7 Claims. (Cl. 73—64)

This invention relates to an apparatus for determining the cold-sludging properties of liquid lubricants. More particularly, this invention is directed to an apparatus for testing engine lubricants to determine quantitatively the tendency of various lubricants to form sludge under low-temperature conditions of use.

One of the problems associated with modern crankcase oils is that, in high-performing engines, they tend to form deleterious sludge when the engines are operated at low temperatures. Such low-temperature sludging occurs most frequently in the period just after the engine has been started. The principal prior method for evaluating this sludging tendency of lubricants is to conduct full-scale engine tests while controlling the engine crankcase temperature, contaminant concentration, and contaminant type within the crankcase oil and vapors. Such tests are difficult to standardize and control, time-consuming, and expensive, and because of the difficulties associated with accurately controlling operating conditions, they do not adequately discriminate between oils having relatively low sludging tendencies. While current engine-test methods for evaluating the low-temperature sludging tendencies of oils are capable of distinguishing between oils having outstandingly good or poor sludging tendencies, they are not sufficiently precise to yield meaningful discrimination among oils having relatively good low-temperature sludging characteristics.

It is an object of this invention to provide a low-cost apparatus whereby better discrimination is obtained in measuring the low-temperature sludging characteristics of lubricating oils. Another object of this invention is to provide a test apparatus by which the cold-sludging characteristics of lubricant oils can be quantitatively determined with a high degree of accuracy.

Briefly, the apparatus of this invention comprises a vessel in which a cylindrical drum is rotatively supported. The vessel is shaped to provide a chamber adapted to contain a lubricant test sample, and a second chamber to contain a gaseous test atmosphere. Rotation of the drum causes the periphery thereof to dip into the test lubricant sample and then pass upward into the controlled test atmosphere. Means are provided for maintaining the periphery of the drum at any desired cool temperature and to maintain the lubricant sample at normal crankcase temperature. Inlet and outlet means are provided by which the test atmosphere may be circulated through the chamber provided therefor. As the drum rotates, a thin film of lubricant is deposited thereon and cooled to the temperature of the peripheral surface of the drum. This thin, cooled film of lubricant rises upward into contact with the test atmosphere which contains sufficent moisture to cause water to condense on the oil film. Thus, the water-vapor content of the atmosphere should be such that the dew-point thereof exceeds the oil-film temperature. The lubricant may, if desired, be contaminated with chemicals typical of those found in blow-by gases, either by direct addition of the chemicals to the oils, or by the addition of blow-by gas components to the controlled, moisture-containing atmosphere which is maintained in the gas chamber. Alternatively, exhaust from a gasoline engine may directed into the gas chamber and circulated therethrough.

This invention is best described with reference to the drawing, which is a frontal view, partly in section, of a perferred embodiment of the apparatus. Vessel 6 is shaped to form a lubricant chamber 8 and a gas chamber 10. Oil sample 12 is disposed within the lower lubricant chamber. This chamber is provided with outlet 13 which is controlled by valve 14. Electric heater 16, together with thermo-regulator sensing element 18, provide means for maintaining the temperature of the lubricant sample in chamber 8 at a desired predetermined temeprature. Extending through sealed bushings 26 and 28, which are supported in the side walls of vessel 6, is a hollow shaft 30, which opens into a hollow cylindrical drum 32 mounted thereon. Drum 32 is so located that a portion of the periphery of the drum extends into lubricant chamber 8, while a second portion of the periphery of the drum extends into gas chamber 10. Rotation of the drum causes points on the periphery thereof to pass from the lubricant chamber 8 to the gas chamber 10, and then back to the lubricant chamber, and so forth. As the periphery of the drum passes downward into the lubricant test sample 12, a thin film of oil is deposited on the drum surface. The oil film rises with the drum into gas chamber 10 where it is exposed to the controlled atmosphere maintained in the gas chamber. Preferably, drum 32 has a roughened exterior surface 33. A suitable roughened surface can be provided by knurling the periphery of the drum. The drum assembly is positioned so that drum 32 is partially immersed in oil sample 12 when the oil is maintained at a standard level.

One end of hollow shaft 30 communicates with coolant supply line 34, and a rotating seal is provided between the shaft 30 and coolant line 34 by packing gland 36. The opposite end of shaft 30 similarly communicates with an outlet line 38 and is sealed in rotatable relationship therewith by means of packing gland 40. The entire drum assembly may be rotated slowly by means of pulley 42, belt 44, and electric motor 46. Vessel 6 is preferably made with a removable upper portion 50, which is equipped with an inlet 52 and an outlet 54, both of which communicate with the gas chamber 10 to provide means for circulating a controlled test atmosphere within the gas chamber.

In use, vessel 6 is filled to a standard depth with test lubricant 12, the vessel being fabricated into a separable upper portion 50 and a lower portion 54 as shown, for ease of filling. A thermo-regulator, not shown, is adjusted to maintain the oil at the desired test temperature, such as 200° F., and coolant water at faucet temperature is caused to flow through coolant line 34, through the interior of drum 32, and outward through drainline 38. The drum is then rotated at a standard speed and a controlled atmosphere is introduced into gas chamber 10 through inlet 52, and passes out through outlet 54. The test is continued for a desired standard period of time, such as 40 hours. The speed at which drum 32 is rotated is not critical, but it is preferred that the rotation be maintained within the range of 2 to 6 revolutions per minute. The test atmosphere may consist of air saturated with water vapor so that condensation will occur on the chilled oil film on the drum surface and cause contamination of the test oil in simulation of actual crankcase operating conditions. Alternatively, test conditions may be established by passing exhaust gases from an internal combustion engine, such as an automotive engine, through inlet 52 into gas chamber 10 and then outward through outlet 54, to exhaust. If desired, ice-water or artificially cooled fluid at temperatures of −20° to 60° F., may be used in place of tap water to simulate extremely cold starting conditions. At the conclusion of the test period, the lubricant is drained through outlet line 13 by opening valve 14. The amount and type of sludge or other deposits accumulated in the reservoir, or in the lubricant sample, or on the surface of the drum, may be determined by inspection. The relative sludging tendencies of oils are thus readily determined.

An advantage of the method of this invention is that the test fluid does not have to provide lubricity to operating surfaces while being tested, and accordingly the sludging tendencies of individual lubricant components can be evaluated, and extremely valuable fundamental information thereby obtained. For example, bright stocks, oil extracts, and individual liquid additives can be tested in the apparatus of this invention, which can not be tested by actual engine operation because the test sample may fail to provide adequate lubrication, resulting in the destruction of the engine.

While the apparatus of this invention has been defined with reference to a preferred embodiment, modifications of the apparatus will be at once apparent to those skilled in this art. For example, drum 32 may be replaced by various suitably shaped, hollow test bodies which may be alternately immersed in the lubricant sample and then raised into exposure with the controlled atmosphere. This may be accomplished by mounting the test body eccentrically with respect to a shaft, such as shaft 30, as that by alternate clockwise and counter-clockwise rotation of the shaft, the test body is transported between the two chambers of vessel 6. As another alternative, the test body may be movably supported within the chamber, and means may be provided to move the test body with a periodic, reciprocating motion from the lubricant chamber to the gas and back to the lubricant chamber. Such motion may be arcuate or rectilinear. Mechanisms for providing such motion may readily be selected from various texts directed to machine elements and motion mechanisms.

The embodiments of the invention in which a special property or privilege is claimed are defined as follows:

1. An apparatus for evaluting the cold-sludging properties of lubricants comprising a vessel internally shaped to define a lubricant chamber and a gas chamber communicating therewith, inlet and outlet means communicating with said gas chamber for the circulating of a test atmosphere therethrough, a body having a hollow interior movably supported within said vessel for movement between said chambers, means for cyclically moving said body from one chamber to the other, whereby a film of lubricant being evaluated is deposited on said body in said lubricant chamber and the film of lubricant is exposed to the test atmosphere in said gas chamber, said body being supported such that the film of lubricant on the entire outer surface of said body in said gas chamber is exposed to the test atmosphere in said gas chamber, inlet and outlet means communicating with the interior of said body for the circulation of cooling fluid therethrough and means for maintaining said lubricating chamber at a temperature higher than said cooling liquid.

2. An apparatus for evaluating the cold-sludging properties of lubricants comprising a vessel internally shaped to define a lubricant chamber and a gas chamber communicating therewith, inlet and outlet means communicating with said gas chamber for the circulation of a test atmosphere therethrough, a drum having a hollow interior rotatively supported within said vessel such that points on the peripheral surface of said drum pass from one said chamber to the other as said drum is rotated, means for rotating said drum with respect to said vessel whereby a film of lubricant being evaluated is deposited on said drum in said lubricant chamber and the film of lubricant is exposed to the test atmosphere in said gas chamber, said drum being supported such that the film of lubricant on the entire outer surface of said drum in said gas chamber is exposed to the test atmosphere in said gas chamber, inlet and outlet means communicating with the interior of said drum for the circulation of cooling fluid therethrough and means for maintaining said lubricating chamber at a temperature higher than said cooling liquid.

3. An apparatus according to claim 2 in which said drum is cylindrical.

4. An apparatus according to claim 3 in which said drum is coaxially mounted on a shaft, and said shaft extends from the sides of said drum through said vessel to the exterior thereof, and includes bearings secured to said vessel and supporting said shaft.

5. An apparatus according to claim 4 in which said shaft contains hollow portions extending from the exterior of said vessel and communicating with the interior of said drum, and said hollow portions comprise the first said inlet and outlet means.

6. An apparatus according to claim 5 in which said vessel is separable into two portions to expose said drum for visual inspection.

7. An apparatus according to claim 6 including a valve-controlled outlet communicating with said lubricant chamber.

References Cited in the file of this patent

UNITED STATES PATENTS

| | | |
|---|---|---|
| 2,027,903 | Dintilhac | Jan. 14, 1936 |
| 2,337,414 | Rieber | Dec. 21, 1943 |

FOREIGN PATENTS

| | | |
|---|---|---|
| 316,000 | Germany | Nov. 18, 1919 |
| 867,243 | France | July 7, 1941 |

UNITED STATES PATENT OFFICE
CERTIFICATE OF CORRECTION

August 11, 1964

Patent No. 3,143,877

Robert G. Moyer

It is hereby certified that error appears in the above numbered patent requiring correction and that the said Letters Patent should read as corrected below.

Column 1, line 68, after "may" insert -- be --; column 2, line 8, for "temeprature" read -- temperature --; column 3, line 23, for "as", second occurrence, read -- so --; line 30, after "gas" insert -- chamber --; line 41, for "circulating" read -- circulation --.

Signed and sealed this 8th day of December 1964.

(SEAL)
Attest:

ERNEST W. SWIDER
Attesting Officer

EDWARD J. BRENNER
Commissioner of Patents